(12) United States Patent
Call et al.

(10) Patent No.: US 10,514,714 B1
(45) Date of Patent: Dec. 24, 2019

(54) SMART HVAC

(71) Applicant: Vivint, Inc., Provo, UT (US)

(72) Inventors: Brian Call, Draper, UT (US); Nicholas Brown, Draper, UT (US); Jason Carter, Lehi, UT (US); Darren Noble, Pleasant Grove, UT (US); Brandon Hatch, Provo, UT (US); Brandon Bunker, Highland, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/957,538

(22) Filed: Apr. 19, 2018

Related U.S. Application Data

(63) Continuation of application No. 14/475,085, filed on Sep. 2, 2014, now Pat. No. 9,951,965.

(51) Int. Cl.
*G05D 23/00* (2006.01)
*G05D 23/19* (2006.01)
(Continued)

(52) U.S. Cl.
CPC .......... *G05D 23/1934* (2013.01); *F24F 11/30* (2018.01); *F24F 11/62* (2018.01); *F24F 11/83* (2018.01); *G05B 15/02* (2013.01); *G05B 19/042* (2013.01); *F24F 11/54* (2018.01); *F24F 11/56* (2018.01); *F24F 2110/10* (2018.01); *F24F 2130/00* (2018.01); *F24F 2130/10* (2018.01); *F24F 2130/20* (2018.01); *G05B 2219/2614* (2013.01); *G05B 2219/2642* (2013.01)

(58) Field of Classification Search
CPC .............. B60H 1/00871; G05B 15/02; G05B 2219/2614; G08C 17/02; F24F 11/006; F24F 2130/20; F04D 25/088; H05B 37/0272; F25B 49/005; E06B 9/303; B32B 17/10036; B60J 3/04; G05D 23/1934

See application file for complete search history.

(56) References Cited

U.S. PATENT DOCUMENTS 6,795,226 B2 * 9/2004 Agrawal ........... B32B 17/10036
359/265
7,188,779 B2 3/2007 Alles
(Continued)

FOREIGN PATENT DOCUMENTS

WO 2014071046 A1 5/2014

*Primary Examiner* — Tuan A Vu
(74) *Attorney, Agent, or Firm* — Holland & Hart LLP

(57) ABSTRACT

A method for heating ventilation and air conditioning (HVAC) systems is described. In one embodiment, the method includes measuring a temperature of a first room of a building via a first thermometer placed in the first room and measuring a temperature of a second room of the building via a second thermometer placed in the second room and receiving the temperature of the first room via a first data communication device communicatively coupled to a first HVAC register in the first room and receiving the temperature of the second room via a second data communication device communicatively coupled to a second HVAC register in the second room. In some cases, the first data communication device is configured to communicate data between the first thermometer and a central automation controller and the second data communication device is configured to communicate data between the second thermometer and the central automation controller.

20 Claims, 6 Drawing Sheets

(51) Int. Cl.
   *G05B 19/042*   (2006.01)
   *F24F 11/83*    (2018.01)
   *G05B 15/02*    (2006.01)
   *F24F 11/62*    (2018.01)
   *F24F 11/30*    (2018.01)
   *F24F 11/56*        (2018.01)
   *F24F 11/54*        (2018.01)
   *F24F 130/10*       (2018.01)
   *F24F 130/20*       (2018.01)
   *F24F 110/10*       (2018.01)
   *F24F 130/00*       (2018.01)

(56) References Cited

U.S. PATENT DOCUMENTS

| | | | |
|---|---|---|---|
| 8,621,881 B2 | 1/2014 | Votaw et al. | |
| 8,695,888 B2 | 4/2014 | Kates | |
| 2007/0220907 A1* | 9/2007 | Ehlers | F25B 49/005 |
| | | | 62/126 |
| 2010/0163633 A1* | 7/2010 | Barrett | B60H 1/00871 |
| | | | 236/49.3 |
| 2012/0024969 A1 | 2/2012 | Kates | |
| 2013/0056543 A1 | 3/2013 | Olivotti et al. | |
| 2013/0134962 A1 | 5/2013 | Kamel et al. | |
| 2013/0211844 A1* | 8/2013 | Sadwick | G08C 17/02 |
| | | | 704/275 |
| 2014/0148996 A1* | 5/2014 | Watkins | B60J 3/04 |
| | | | 701/36 |
| 2015/0116811 A1* | 4/2015 | Shrivastava | G08C 17/02 |
| | | | 359/275 |
| 2015/0189724 A1* | 7/2015 | Karc | H05B 37/0272 |
| | | | 315/149 |
| 2015/0197975 A1* | 7/2015 | Andreasen | G05B 15/02 |
| | | | 700/275 |
| 2015/0204561 A1* | 7/2015 | Sadwick | F24F 11/006 |
| | | | 236/1 C |
| 2015/0284992 A1* | 10/2015 | Hall | E06B 9/303 |
| | | | 160/178.1 R |
| 2015/0369503 A1 | 12/2015 | Flaherty et al. | |
| 2016/0018119 A1* | 1/2016 | Desmet | F04D 25/088 |
| | | | 165/237 |

\* cited by examiner

SMART HVAC

CROSS-REFERENCE TO RELATED APPLICATIONS

The present application is a continuation of U.S. patent application Ser. No. 14/475,085, filed Sep. 2, 2014, titled "SMART HVAC," and assigned to the assignee hereof, the disclosure of which is expressly incorporated herein in its entirety by this reference.

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in building and residential automation, and building and residential heating ventilation and air conditioning (HVAC) systems. For example, advancements in automation allow users to monitor a home or business from anywhere in the world.

SUMMARY

According to at least one embodiment, a method for heating ventilation and air conditioning (HVAC) systems is described. In one embodiment, the method may include measuring a temperature of a first room of a building via a first thermometer placed in the first room and measuring a temperature of a second room of the building via a second thermometer placed in the second room. In some embodiments, the method may include receiving the temperature of the first room via a first data communication device communicatively coupled to a first HVAC register in the first room and receiving the temperature of the second room via a second data communication device communicatively coupled to a second HVAC register in the second room. In some cases, the first data communication device may be configured to communicate data between the first thermometer and a central automation controller and the second data communication device may be configured to communicate data between the second thermometer and the central automation controller.

In some embodiments, the method may include sending a first command to the first data communication device, configuring a climate policy for the first room, and configuring the first command based at least in part on one or more of a monitored airflow, a monitored outside temperature, and the climate policy of the first room. In some cases, the first command may include instructions to actuate a first motor on the first HVAC register, the first motor being configured to adjust louvers on the first HVAC register.

In some embodiments, the method may include sending a second command to the second data communication device, configuring a climate policy of the second room, and configuring the second command based at least in part on one or more of a monitored airflow, a monitored outside temperature, and the climate policy of the second room. In some cases, the second command may include instructions to actuate a second motor on the second HVAC register. The second motor may be configured to adjust louvers on the second HVAC register.

In some embodiments, the method may include adjusting the rate of airflow of the HVAC central heating and cooling unit based at least in part on one or more of an airflow threshold, a monitored rate of airflow of an HVAC central heating and cooling unit, a monitored outside temperature, a climate policy of the first room, and a climate policy of the second room. The method may include monitoring an environment in relation to the first room of the building. The first room may include at least one of a tintable window and an automated blind. Monitoring the environment may include determining at least one of a geographical direction the tintable window faces (e.g., north, south, east, west), a time of day, a current month, a current season, a location of the building in relation to the Earth's northern and southern hemispheres, an output of a photosensor relative to the tintable window, a temperature relative to a surface of the tintable window, and a sun path for a region relative to the building.

In some embodiments, the method may include determining whether an aspect of the monitored environment triggers an action associated with at least one of the automated blinds and the tintable window according to a climate policy for the first room. Upon determining the action is triggered and the action is associated with the tintable window, the method may include adjusting a tint level of the tintable window according to the climate policy for the first room. Upon determining the action is triggered and the action is associated with a positioning of slats on the automated blinds, the method may include raising or lowering the slats on the automated blinds according to the climate policy for the first room, the slats being raised or lowered by a motor. Upon determining the action is triggered and the action is associated with a tilting of slats on the automated blinds, the method may include tilting the slats on the automated blinds according to climate policy for the first room, the slats being tilted by a motor.

A computing device configured for heating ventilation and air conditioning (HVAC) systems is also described. The computing device may include a processor and memory in electronic communication with the processor. The memory may store computer executable instructions that when executed by the processor cause the processor to perform the steps of measuring a temperature of a first room of a building via a first thermometer placed in the first room and measuring a temperature of a second room of the building via a second thermometer placed in the second room. In some embodiments, the memory may store computer executable instructions that when executed by the processor cause the processor to perform the steps of receiving the temperature of the first room via a first data communication device communicatively coupled to a first HVAC register in the first room and receiving the temperature of the second room via a second data communication device communicatively coupled to a second HVAC register in the second room. In some cases, the first data communication device may be configured to communicate data between the first thermometer and a central automation controller and the second data communication device may be configured to communicate data between the second thermometer and the central automation controller.

A non-transitory computer-readable storage medium storing computer executable instructions is also described. When the instructions are executed by a processor, the execution of the instructions may cause the processor to perform the steps of measuring a temperature of a first room of a building via a first thermometer placed in the first room and measuring a temperature of a second room of the building via a second thermometer placed in the second room. In some embodiments, the execution of the instructions may cause the processor to perform the steps of receiving the temperature of the first room via a first data communication device communicatively coupled to a first HVAC register in the first room and receiving the temperature of the second room via a second data communication device communicatively coupled to a second HVAC register in the second room. In some cases, the first data communication device may be configured to communicate data between the first thermometer and a central automation controller and the second data communication device may be configured to communicate data between the second thermometer and the central automation controller.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
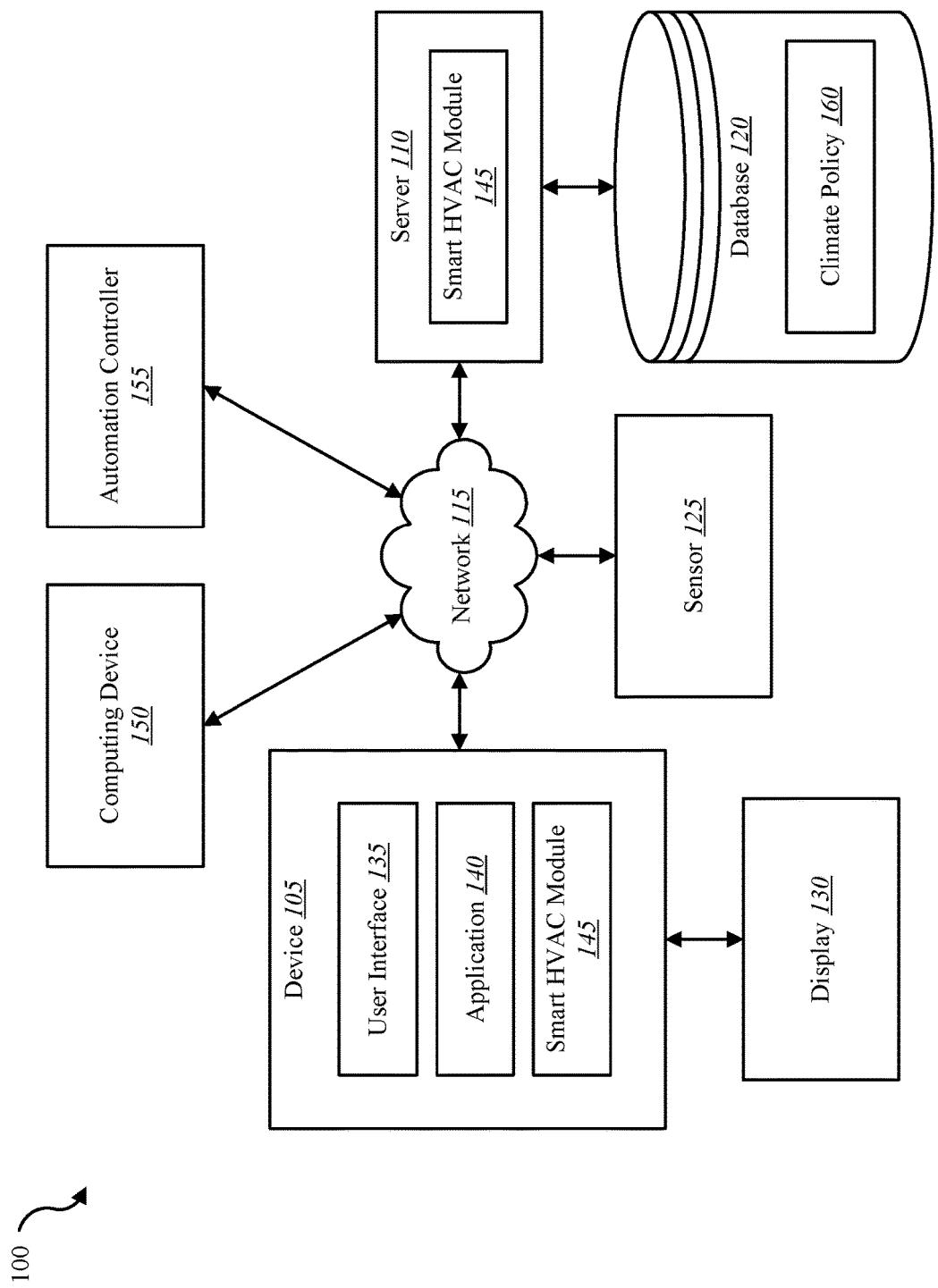
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to building and residential automation and security systems. More specifically, the systems and methods described herein relate to heating ventilation and air conditioning (HVAC) systems in relation to a building and residential automation system. Some embodiments of the systems and methods described herein relate to heating ventilation and air conditioning (HVAC) systems in relation to an integration of building or residential automation systems.

The typical HVAC system uses a single thermostat located in a central location. A single thermostat may control the heating and cooling of an entire home. Different areas of the home, however, experience varying amounts of heating and cooling due to outdoor weather conditions. A south-facing, unshaded room in the summer may experience a higher room temperature than another south-facing room of the same home that is shaded by a large tree. Also, a south-facing room is typically warmer than a north-facing room. Similarly, a top-level room is likely to be warmer than a lowerlevel room. Nonetheless, the heating and cooling of a typical dwelling is controlled by a central thermostat, resulting in some rooms being served adequately while other rooms are left inadequately served. Accordingly, the systems and methods described herein improve the typical HVAC system to address such concerns.

One aspect of the invention relates to systems, methods and related devices for improving heating ventilation and air conditioning (HVAC) systems. Present HVAC systems are typically controlled by a centrally located thermostat. The centrally located thermostat usually controls a single HVAC heating and cooling unit. A user may configure the thermostat to turn on cooling when the thermostat registers a temperature that satisfies a programmed threshold, and set the thermostat to turn on heating when the thermostat registers a temperature that satisfies another programmed threshold. For example, a user may set the thermostat to trigger heating via turning on a furnace when the thermostat registers 68 degrees Fahrenheit or less. Likewise, a user may set the thermostat to trigger cooling via the air conditioning unit when the thermostat registers 72 degrees Fahrenheit or more.

The problem with using a single thermostat to control an entire house lies in the range of temperatures different areas of the house experience throughout the varying temperatures of the seasons. In the summer, the south and west facing sides of a building are likely to experience higher temperatures than the north and east facing sides. Similarly, higher levels of the building are likely to experience higher temperatures than lower levels. It follows then that in the summer the south and west facing areas and higher levels of the building have greater cooling needs than the north and east facing areas and lower levels. Likewise, in the winter, the north and east facing sides of the building are likely to experience lower temperatures, meaning that they and the lower levels have greater heating needs than the south and west facing area and higher levels. Some HVAC system may employ a first HVAC heating and cooling unit for a first level and a second HVAC heating and cooling unit for a second level. A first thermostat may control the climate of the first level, and a second thermostat may control the climate of the second level. Such dual-HVAC systems may provide some improvement regarding temperature variations from higher and lower levels. Such systems, however, do not improve temperature variations from room to room on a single level.

Moreover, the dual-HVAC systems are rare. The majority of HVAC systems employ a single HVAC system for dwellings such as homes, condos, town homes, offices, etc.

In one embodiment, the present systems and methods remedy the problems of current HVAC systems by employing multiple thermometers (instead of thermostats) throughout areas of the building and actuating motorized louvers on the HVAC registers to adjust airflow in each room of the building. The motorized louvers may be actuated to be fully open allowing a maximum airflow through the register (e.g., 100% of maximum airflow), actuated to be fully closed allowing a minimum airflow (e.g., 0% of maximum airflow), and actuated to variations between max/min (e.g., 50% of maximum airflow, 35% of maximum airflow, 10% of maximum airflow, etc.). In some embodiments, a majority of the rooms and/or areas of the building may include a thermometer. A central controller may monitor the temperatures of each area/room of the building and adjust the motorized louvers accordingly. Each room may include a climate policy. Using the example of a home, the master bedroom, spare bedroom, family room, kitchen, and bathroom of the home may each include a thermometer. Each room may also include one or more HVAC registers with motorized louvers. The motorized louvers may be controllable by the central controller sending commands to a local controller. Thus, each HVAC register may be associated with a local controller configured to communicate between the thermometer and the central controller. Each room/area of the home may include a climate policy. Thus, the master bedroom may include a climate policy different than the climate policy for the kitchen, and so forth. For example, the master bedroom may include a climate policy that stipulates a high temperature threshold of 73 degrees Fahrenheit and a low temperature threshold of 68 degrees Fahrenheit, whereas the kitchen climate policy may stipulate a high temperature threshold of 75 degrees Fahrenheit and a low temperature threshold of 70 degrees Fahrenheit. The central controller may adjust the airflow of each HVAC register based on the individual room/area climate policies.

In some embodiments, the local controller may be located on the HVAC register. In some cases, the local controller may be located on the thermometer of each room/area. In some cases, the local controller may be located separate from the HVAC register and/or the thermometer. Accordingly, the central controller may determine the temperature of each area/room of the home by communicating with the local controllers of each area/room. The central controller may determine the outside temperature and time of day. The central controller may analyze together and/or separately the indoor temperatures of each area/room, the time of day, and the outdoor temperature in relation to the climate policies of each area/room. Based on this analysis, the central controller may send a first command to the local controller of the master bedroom to throttle the louvers of the HVAC register in the master bedroom to 50% of maximum airflow. Likewise, the central controller may send a second command to the local controller of the spare bedroom to throttle the louvers of the HVAC register in the spare bedroom to 65% of maximum airflow, and similarly the family room to 30% of maximum airflow, the kitchen to 25% of maximum airflow, and the bathroom to 10% of maximum airflow. Accordingly, in an automated fashion, without human intervention, the central controller may ensure that certain areas of the home receive more airflow than other areas. As a result, each room receives customized heating and cooling. The system may switch between heating and cooling and adjust the airflow arrangement for each room without any human intervention. It is typical for outdoor temperatures to vary widely in the spring and fall seasons. One day in spring may be relatively cool in which the furnace may be activated, and the next day relatively hot in which the air conditioning unit may be activated. In the typical home, a user may have to adjust each HVAC register by hand from day to day in such cases. With the systems and methods described herein, however, the central controller of a home automatically adjusts the airflow for each controlled room, ensuring a desired comfort level in each area of the home.

In some embodiments, the central controller may monitor airflow at the HVAC heating and cooling unit. Without sufficient airflow, an air conditioning evaporator coil may freeze over, disabling the air conditioning. Accordingly, the central controller may monitor the airflow for the HVAC system and adjust the airflow values for each room/area of the building. If the central controller detects insufficient airflow at the HVAC heating and cooling unit, then the central controller may send a command to one or more rooms to increase the amount of airflow through the HVAC registers of those one or more rooms. For example, if the central controller detects insufficient airflow at the HVAC heating and cooling unit, then the central controller may send a command for the kitchen to increase airflow from 25% of maximum airflow to 50% of maximum airflow. Benefits may be realized by the abovementioned systems and methods, including improved efficiencies relative to HVAC systems, improved levels of comfort, and less wasted energy.

One aspect of the invention relates to systems, methods and related devices for improving the efficiency of heating ventilation and air conditioning (HVAC) systems via window shading. Windows on a home or office are typically more inefficient than the other outer surfaces of homes and offices that include wall paneling, insulation, siding, etc. In some cases, windows may decrease the efficiency of an HVAC system, especially those that face the sun or that receive some portion of direct sunlight in the summer and those that receive no sunlight during the winter. During the summer, a building with a window that receives direct sunlight that is left uncovered may increase the temperature within the building, resulting in an increased amount of work the HVAC system has to do to maintain a comfortable indoor temperature. Likewise, during the winter, a building with a window that receives direct sunlight that is covered (e.g., blinds, curtains, etc.) may result in a decreased temperature in the building, resulting in an increased amount of work the HVAC system has to do to maintain a comfortable indoor temperature. In some embodiments, automated blinds in a building may register their location in the building with an automation controller. For example, automated blinds may register as facing north, south, east, or west. The automation controller may reference the current position of the sun and the current weather. For example, an automation controller may reference the WEATHER CHANNEL® to calculate the position of the sun relative to the building and determine whether the sky is overcast. If the sun is visible (e.g., sky is not overcast) and a room is configured to be cooled, then the automation controller may close the automated blinds of a room facing the sun. If the room is configured to be heated and the sun is visible, then the automated blinds may be opened by a command from the automation controller. Thus, if a room with an east-facing window and a room with a west-facing window are configured to be cooled, during the morning hours the automation system may shut the east-facing blinds to block out the heat from the sun and open the west-facing blinds to let in the morning light. As the day progresses, the east-facing blinds may be opened, but the west-facing blinds may be closed to block heat from the afternoon sun. The opposite behaviors may be used to warm a home with solar energy (e.g., during the winter months).

In one embodiment, the present systems and methods remedy the problems of current window shading systems by automating the covering and uncovering of a window. The systems and methods may employ automated blinds to assist in covering and uncovering of a window. The automated blinds may include a motor to raise and lower the blinds. Additionally, or alternatively, the automated blinds may include a motor to tilt the slats of the blinds open and close. In some embodiments, a window may include an electronically tintable window. In some cases, a film may be applied to a window. The film may include one or more electrical contacts. Based on an electrical signal received by the film, the film may adjust a level of opacity. In one configuration, an opacity of the film may be adjusted to allow light to pass through the window. Likewise, an opacity of the film may be adjusted to block at least a portion of light from passing through the window. Accordingly, the film may be configured to pass, block, and/or reflect light incident on the window. In some embodiments, a window shading policy may be configured. The window shading policy may stipulate the conditions upon which the automated blinds may be raised, the conditions upon which the automated blinds may be lowered, the conditions upon which slats of the automated blinds may be tilted, and/or the conditions upon which an opacity level of a tintable window may be adjusted FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a sensor 125, a display 130, a computing device 150, an automation controller 155, and a network 115 that allows the device 105, the server 110, the computing device 150, automation controller 155, and sensor 125 to communicate with one another. Display 130 may display information regarding the HVAC system. Display 130 may display a user interface to the HVAC system.

Examples of the device 105 may include any combination of mobile devices, smart phones, personal computing devices, computers, laptops, desktops, servers, a media set top box, etc. In some cases, device 105 may include a building automation controller integrated within device 105, or as depicted, may be in communication with an automation controller 155 via network 115. Examples of the automation controller 155 may include any device configured to control a building such as a home, a business, a government facility, etc. Accordingly, examples of automation controller 155 include any combination of a dedicated building automation computing device (e.g., wall-mounted controller), a personal computing device (e.g., laptop, desktop, etc.), a mobile computing device (e.g., tablet computing device, smartphone, etc.), and the like. Examples of computing device 150 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, etc.

Examples of sensor 125 may include any combination of a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, other types of sensors, actuators, or combinations thereof. Sensor 125 may represent one or more separate sensors or a combination of two or more sensors in a single device. For example, sensor 125 may represent one or more camera sensors and one or more motion sensors connected to environment 100. Sensor 125 may be integrated with an identity detection system such as a facial recognition system and/or a voice recognition system. Although sensor 125 is depicted as connecting to device 105 over network 115, in some embodiments, sensor 125 may connect directly to or within device 105. Additionally, or alternatively, sensor 125 may be integrated with a home appliance or fixture such as a light bulb fixture.

In some configurations, the device 105 may include a user interface 135, application 140, and smart HVAC module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, smart HVAC module 145, automation controller 155, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a smart HVAC module 145. For example, device 105 may include application 140 that allows device 105 to interface with automation controller 155 via smart HVAC module 145 located on another device such as computing device 150 and/or server 110. In some embodiments, device 105, automation controller 155, and server 110 may include a smart HVAC module 145 where at least a portion of the functions of smart HVAC module 145 are performed separately and/or concurrently on device 105, automation controller 155, and/or server 110. Likewise, in some embodiments, a user may access the functions of device 105 and/or automation controller 155 (directly or through device 105 via smart HVAC module 145) from computing device 150. For example, in some embodiments, computing device 150 includes a mobile application that interfaces with one or more functions of device 105, automation controller 155, smart HVAC module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include climate policy 160. For example, device 105 may access climate policy 160 in database 120 over network 115 via server 110.

Climate policy 160 may include data regarding environment control for a particular room. For example, database 120 may store separate climate policies for each room in a building. In some cases, the policies for each room may be included in climate policy 160. The climate policy 160 may include temperature settings for a room. In some cases, climate policy 160 may include one or more triggers for adjusting automated HVAC registers, automated blinds, and/or tintable windows based on a monitored environment. In some cases, climate policy 160 may include one or more thresholds (e.g., airflow threshold, etc.) used to trigger commands to control an environment.

Smart HVAC module 145 may enable monitoring of an environment in association with one or more rooms of a building, analyzing the temperature of each room of the building and adjusting one or more aspects of an HVAC system based on a climate policy. For example, smart HVAC module 145 may adjust the rate of airflow, adjust a tint level of a tintable window, raise or lower slats on automated blinds, and/or tilt the slats of the automated blinds. In some embodiments, smart HVAC module 145 may be configured to perform the systems and methods described herein in conjunction with user interface 135 and application 140. Further details regarding the smart HVAC module 145 are discussed below.

Figure 2:
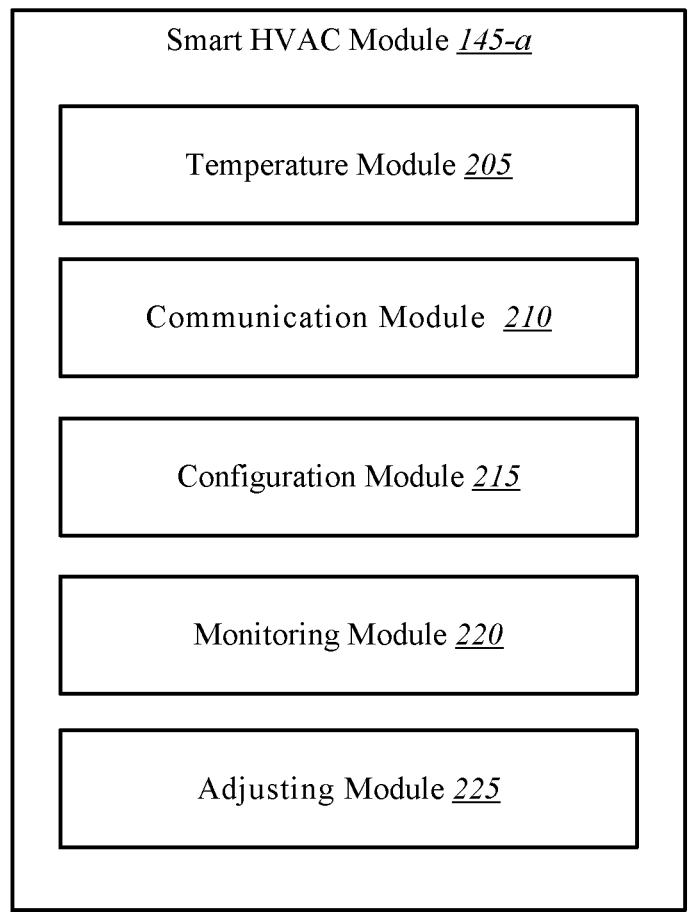
FIG. 2 is a block diagram illustrating one example of a smart HVAC module.

FIG. 2 is a block diagram illustrating one example of a smart HVAC module 145-a. Smart HVAC module 145-a may be one example of smart HVAC module 145 depicted in FIG. 1. As depicted, smart HVAC module 145-a may include temperature module 205, a communication module 210, a configuration module 215, a monitoring module 220, and an adjusting module 225.

In one embodiment, temperature module 205 may measure a temperature of a first room of a building via a first thermometer placed in the first room. Similarly, temperature module 205 may measure a temperature of a second room of the building via a second thermometer placed in the second room. In some cases, the first and/or second thermometers may be integrated into element of either room. For example, the first thermometer may be integrated into a light switch in the first room. Likewise, the second thermometer may be integrated into an electrical outlet in the second room. In some cases the second thermometer may be integrated in window blinds on a window of the second room.

In some embodiments, communication module 210 may receive the temperature of the first room via a first data communication device communicatively coupled to a first HVAC register in the first room. For example, the first data communication device may include a wireless network communication device. The first data communication device may be configured to communicate data between the first thermometer and a central automation controller. In some embodiments, communication module 210 may receive the temperature of the second room via a second data communication device communicatively coupled to a second HVAC register in the second room. Accordingly, the second data communication device may be configured to communicate data between the second thermometer and the central automation controller. Thus, the temperature of each room in a building may be monitored and relayed to a central controller.

In some embodiments, communication module 210 may send a command to the first data communication device. This command may include instructions to actuate a motor on the first HVAC register. The motor may be configured to adjust louvers on the first HVAC register. Thus, the airflow into any room may be adjusted automatically via automation commands instructing an automated HVAC register to open and/or close the louvers of the register. In some cases, configuration module 215 may configure a climate policy for the first room. One or more sensors associated with a room of the building may be configured to monitor airflow in the room, an outside temperature, and the like. Configuration module 215 may configure a command based at least in part on one or more of a monitored airflow of the first room, a monitored temperature of the first room, a monitored outside temperature, and the climate policy of the first room.

In some embodimetns, communication module 210 may send a command to the second data communication device. This command may include instructions to actuate a motor on the second HVAC register of the second room. As with the first HVAC register, this motor may be configured to adjust louvers on the second HVAC register. In some cases, configuration module 215 may configure a climate policy for the second room. Configuration module 215 may configure a command based at least in part on one or more of a monitored airflow of the second room, a temperature of the second room, a monitored outside temperature, and the climate policy of the second room.

In one embodiment, adjusting module 225 may adjust the rate of airflow of the HVAC central heating and cooling unit based at least in part on the monitoring module 220 monitoring one or more of a rate of airflow of an HVAC central heating and cooling unit in relation to an airflow threshold, an outside temperature, temperatures of the first and second rooms, a climate policy of the first room, and a climate policy of the second room.

In some embodiments, monitoring module 220 may monitor an environment in relation to the first and/or second room of the building. Either room may include a tintable window and/or an automated blind. In addition to monitoring a temperature in a particular room and/or an outside temperature, monitoring the environment may include determining at least one of a geographical direction the tintable window faces, a time of day, a current month, a current season, a location of the building in relation to the Earth's northern and southern hemispheres, an output of a photosensor relative to the tintable window, a temperature relative to a surface of the tintable window, and a sun path for a region relative to the building. Accordingly, the climate policies of the first and/or second rooms may be configured according to the monitoring of the environment. Thus, a command to adjust a tintable window and/or automated blinds may be configured and executed according to the monitoring of the environment. Likewise, a command to adjust an HVAC register may be configured and executed according to the monitoring of the environment.

In one embodiment, the photosensor may determine whether the sun is shining on a window of a building. In one example, the monitoring module 220 may query a weather data resource for information regarding a position of the sun. The query may include information regarding the position of the sun. For example, the information may include the angle of the sun in its course from east to west, a current season, the position of the sun relative to the seasonal tilting of the sun from north to south and vice versa. In some cases, the weather data resource may include weather data on a server or a device (e.g., database 120). In some cases, the weather data resource may include an online weather forecasting service (e.g., WEATHER.COM®, etc.). Thus, the monitoring module 220 may determine that the sun is shining on a particular window of the building, but a photosensor positioned relative to this window may indicate that the sun is not shining on the window. Thus, the smart HVAC module 145 may determine that the sun is covered by clouds, that the sky is overcast. Accordingly, smart HVAC module 145 may send a command to adjust the tint of the tintable windows in that room, adjust the height of the automated blinds in that room, and/or adjust the tilt of the slats in the automated blinds in that room based on the climate policy for that room. For example, if the climate policy for the room specifies cooling the room, then the automated blinds may be lifted and the tint level of the tintable window adjusted to allow in light. Upon detecting the sun shining directly on the window (e.g., the sun is no longer covered by clouds), the automated blinds may be lowered and tilted to block light and heat, and the tint level adjusted to reflect the light and heat of the sun.

In one embodiment, monitoring module 220 may determine whether an aspect of the monitored environment triggers an action associated with at least one of the automated blinds and the tintable window according to a climate policy for a particular room. Upon determining the action is triggered and the action is associated with the tintable window, adjusting module 225 may adjust a tint level of the tintable window according to the climate policy for the particular room. Upon determining the action is triggered and the action is associated with a positioning of slats on the automated blinds, adjusting module 225 may raise or lower the slats on the automated blinds according to the climate policy for the particular room. The slats may be raised or lowered by a motor. Upon determining the action is triggered and the action is associated with a tilting of slats on the automated blinds, adjusting module 225 may tilt the slats on the automated blinds according to the climate policy for the particular room. The slats may be tilted in conjunction with a motor.

Figure 3:
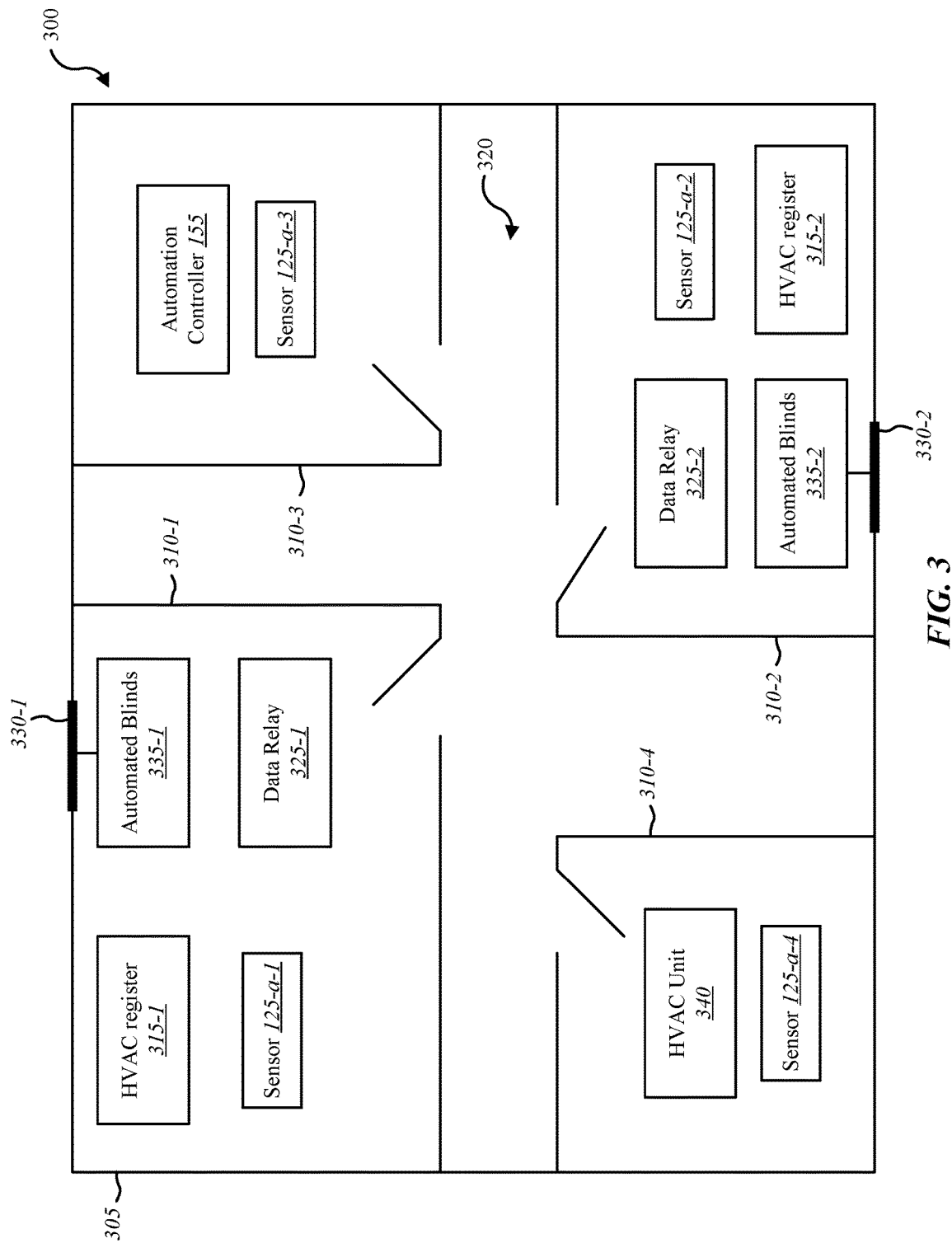
FIG. 3 is a block diagram illustrating one example of an environment for heating ventilation and air conditioning (HVAC) systems.

FIG. 3 is a block diagram illustrating one example of an environment 300 for a smart HVAC system. As depicted, building 305 (e.g., a home or office) may include one or more rooms. For example, building 305 may include rooms 310-1, 310-2, 310-3, and 310-4, as well as a central area 320 (e.g., a hallway, an entry way, an reception area, etc.). At least one room may include automation controller 155. Room 310-4 may include HVAC unit 340. HVAC unit 340 may include a furnace and/or an air conditioning system. Each room may include duct work connected to HVAC unit 340. The duct work may attach to HVAC registers in particular rooms. One or more rooms of building 305 may include data relays, i.e., data communication devices. As depicted, room 310-1 may include data relay 325-1 and room 310-2 may include data relay 325-2. In some cases, one or more rooms may include tintable windows and automated blinds. As depicted, room 310-1 may include tintable window 330-1 and automated blinds 335-1. Likewise, room 310-2 may include tintable window 330-2 and automated blinds 335-2. Each room may include one or more sensors. As depicted, room 310-1 may include sensor 125-*a*-1, room 310-2 may include sensor 125-*a*-2, room 310-3 may include sensor 125-*a*-3, and room 310-4 may include sensor 125-*a*-4. Sensors 125-*a* may be examples of sensor 125 from FIG. 1. Each sensor 125-*a* depicted may represent one or more sensors. For example, sensor 125-*a*-1 may include a motion sensor, a temperature sensor, a light sensor, and so on.

The sensors 125-*a* may monitor the environment of each room of building 305. For example, sensors 125-*a* may detect the presence of a person in a room, may detect a temperature in a room and/or outside building 305, detect a level of light within a room, detect direct sun on a window of a room, etc. In some embodiments, sensor 125-*a*-1 may detect when a person enters room 310-1. Additionally, or alternatively, sensor 125-*a*-1 may measure a temperature of room 310-1. In some cases, sensor 125-*a*-1 may determine at least one of a geographical direction tintable window 330-1 faces, a time of day, a current month, a current season, a location of the building 305 in relation to the Earth's northern and southern hemispheres, an output of a photosensor relative to the tintable window, a temperature relative to a surface of the tintable window, a sun path for a region relative to the building 305, and the like.

Data relays 325 may be configured to receive data from HVAC registers 315 and/or sensors 125-*a* and send this data to automation controller 155. Data relays 325 may be configured to receive data from automation controller 155 and send this data to HVAC registers 315 and/or sensors 125-*a*. As an example, automation controller 155 may receive a temperature of room 310-1 based on sensor 125-*a*-1 measuring the temperature of room 310-1, sending this temperature data to data relay 325-1, and data relay 325-1 sending this temperature data to automation controller 155. Automation controller 155 may analyze the data from each room and generate one or more commands to control HVAC unit 340, HVAC registers 315, tintable windows 330, and/or automated blinds 335. Automation controller 155 may send a command to data relay 325-1 and data relay 325-1 may relay the command to the one or more intended targets. For example, automation controller 155 may adjust, via a relayed command, the level of tint on tintable windows 330 based on the analyzed data of the environment both in and out of building 305. Likewise, automation controller 155 may send a command to adjust the automated blinds 335-1 (e.g., raise or lower the blinds, and/or tilt the slats of the automated blinds).

As depicted, automation controller 155 may be located in one of the rooms (e.g., room 310-3 as depicted). Each room may include a speaker through which announcements may be made. Certain rooms may be occupied at any given time. In some embodiments, each room may include one or more sensors communicatively coupled to automation controller 155. For example, room 310-1 may include sensor 125-*a*-1, room 310-2 may include sensor 125-*a*-2, room 310-3 may include sensor 125-*a*-1-3, and room 310-4 may include sensor 125-*a*-1-4.

Figure 4:
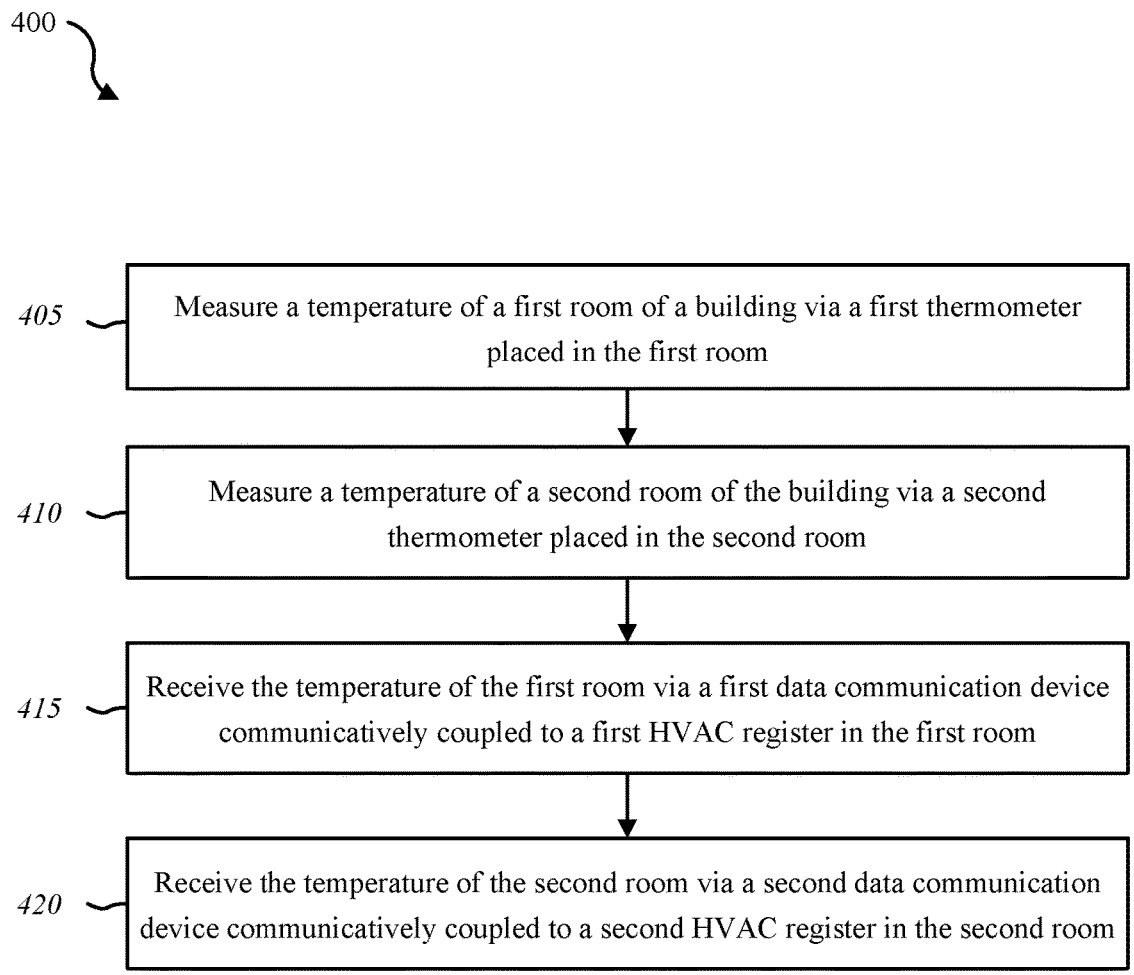
FIG. 4 is a flow diagram illustrating one embodiment of a method for heating ventilation and air conditioning (HVAC) systems.

FIG. 4 is a flow diagram illustrating one embodiment of a method 400 for heating ventilation and air conditioning (HVAC) systems. In some configurations, the method 400 may be implemented by the smart HVAC module 145 illustrated in FIGS. 1 and/or 2. In some configurations, the method 400 may be implemented in conjunction with the application 140 and/or the user interface 135 illustrated in FIG. 1.

At block 405, a temperature of a first room of a building may be measured via a first thermometer placed in the first room. At block 410, a temperature of a second room of the building may be measured via a second thermometer placed in the second room. At block 415, the temperature of the first room may be received via a first data communication device communicatively coupled to a first HVAC register in the first room. The first data communication device may be configured to communicate data between the first thermometer and a central automation controller. At block 420, the temperature of the second room may be received via a second data communication device communicatively coupled to a second HVAC register in the second room. The second data communication device may be configured to communicate data between the second thermometer and the central automation controller.

Figure 5:
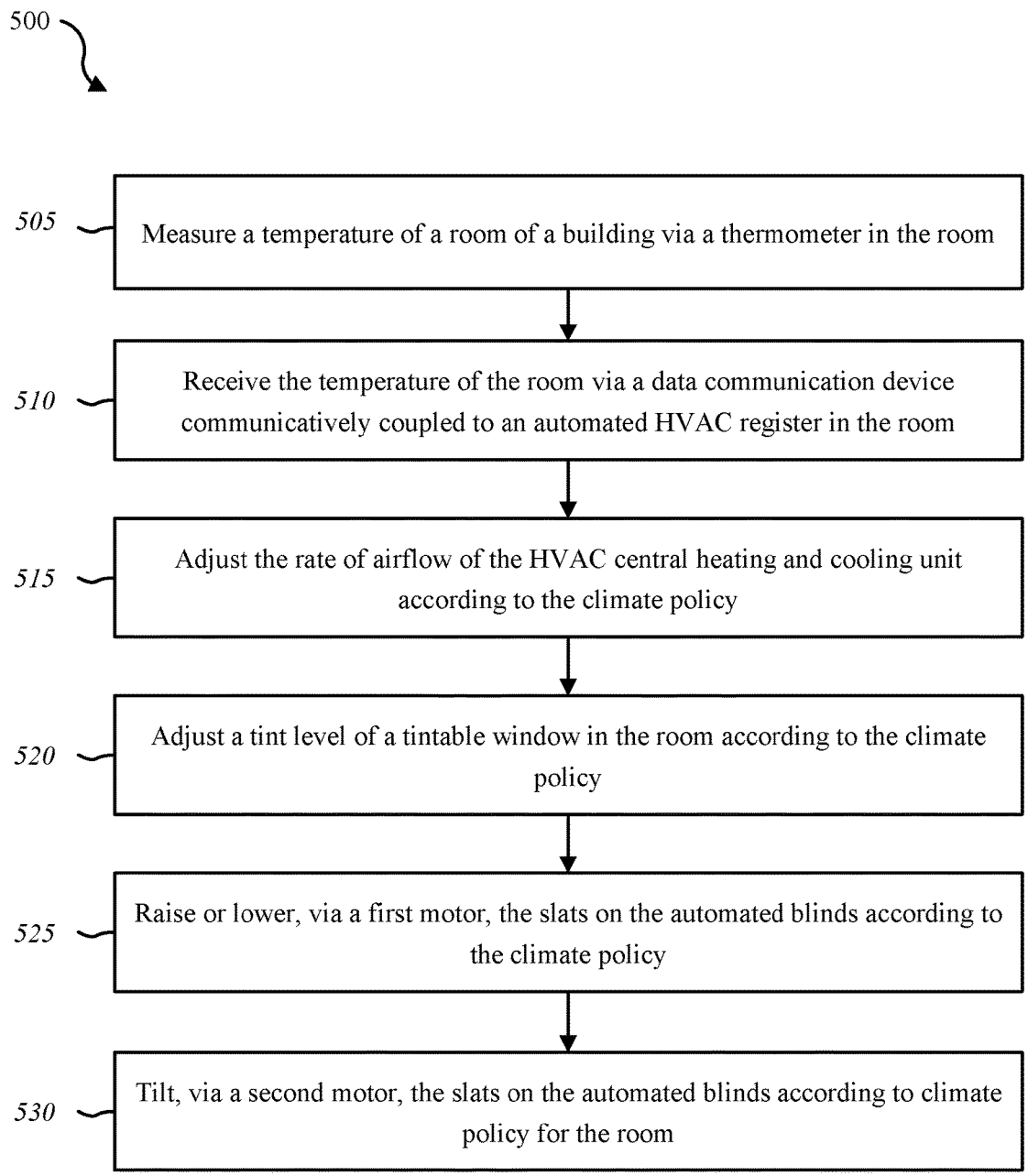
FIG. 5 is a flow diagram illustrating one embodiment of a method for heating ventilation and air conditioning (HVAC) systems.

FIG. 5 is a flow diagram illustrating one embodiment of a method 500 for heating ventilation and air conditioning (HVAC) systems. In some configurations, the method 500 may be implemented by the smart HVAC module 145 illustrated in FIG. 1 or 2. In some configurations, the method 500 may be implemented in conjunction with the application 140 and/or the user interface 135 illustrated in FIG. 1.

At block 505, a temperature of a room of a building may be measured via a thermometer placed in the room. At block 510, the temperature of the room may be received via a data communication device communicatively coupled to an automated HVAC register in the room. The data communication device may be configured to communicate data between the thermometer and a central automation controller. At block 515, the rate of airflow of the HVAC central heating and cooling unit may be adjusted according to the climate policy. The rate of airflow may be adjusted, in accordance with the climate policy, based at least in part on one or more of an airflow threshold, a monitored rate of airflow of an HVAC central heating and cooling unit, and a monitored outside temperature. In some cases, the rate of airflow may be adjusted via positioning louvers of an automated HVAC register. At block 520, a tint level of a tintable window in the room may be adjusted according to the climate policy. At block 525, the slats on the automated blinds may be raised or lowered, via a first motor, according to the climate policy. At block 530, the slats on the automated blinds may be tilted, via a second motor, according to climate policy for the room.

Figure 6:
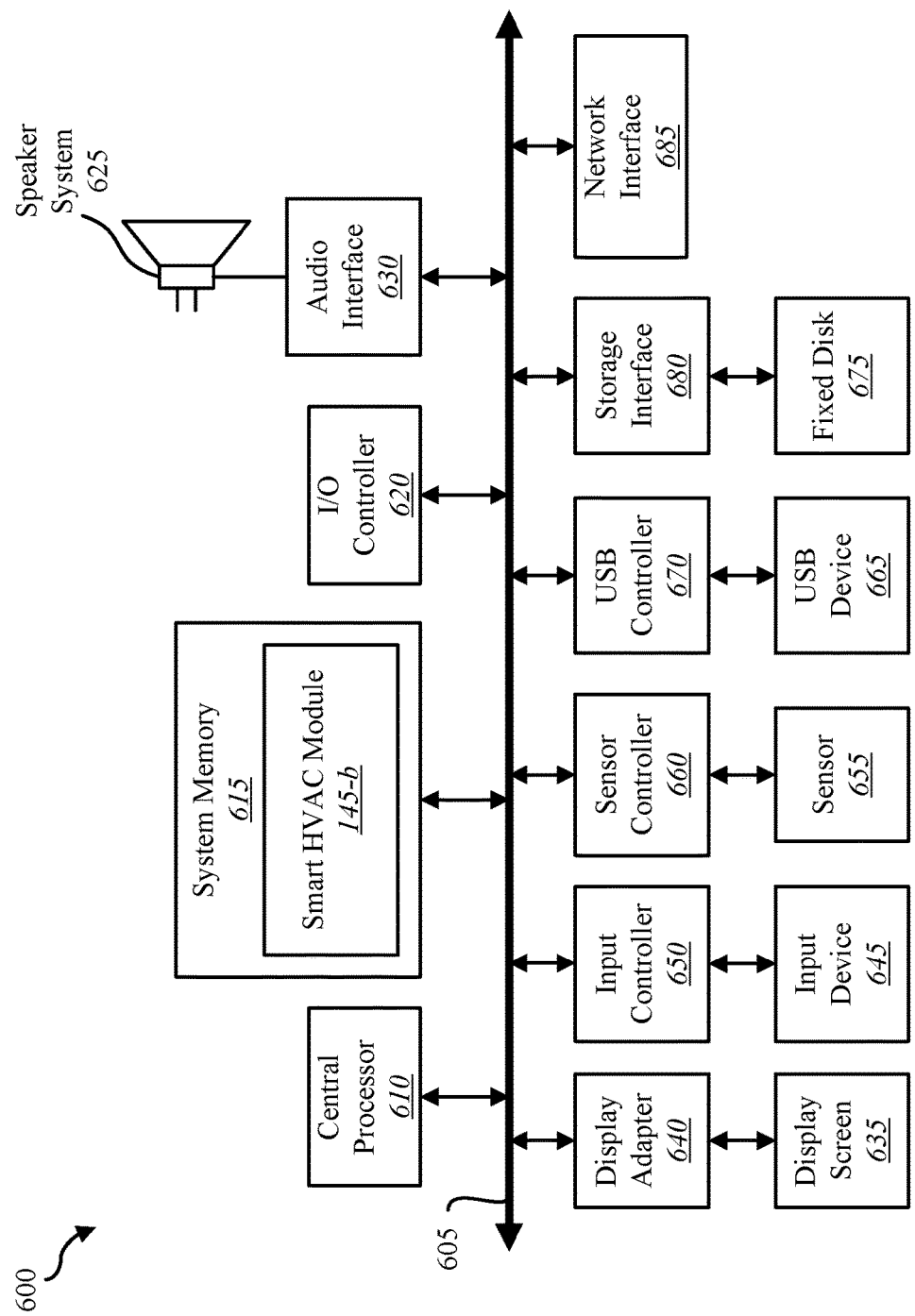
FIG. 6 depicts a block diagram of a computer system suitable for implementing the present systems and methods.

FIG. 6 depicts a block diagram of a computing device 600 suitable for implementing the present systems and methods. The device 600 may be an example of device 105, computing device 150, automation controller 155 and/or server 110 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the smart HVAC module 145-*b* to implement the present systems and methods may be stored within the system memory 615. Applications (e.g., application 140) resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for heating ventilation and air conditioning (HVAC) systems, comprising:
   measuring a temperature of a first room of a building via a first thermometer placed in the first room;
   measuring a temperature of a second room of the building via a second thermometer placed in the second room;
   determining a first geographical direction faced by a first tintable window of the first room and a second geographical direction faced by a second tintable window of the second room;
   monitoring an environment in relation to the first room of the building based at least in part on the first geographical direction and an environment in relation to the second room of the building based at least in part on the second geographical direction;
   adjusting an opacity of, the first tintable window of the first room based at least in part on the measured temperature of the first room and the monitored environment in relation to the first room; and
   adjusting an opacity of, the second tintable window of the second room based at least in part on the measured temperature of the second room and the monitored environment in relation to the second room.

2. The method of claim 1, further comprising:
   configuring a climate policy for the first room, wherein adjusting the opacity of the first tintable window of the first room is based at least in part on the configured climate policy.

3. The method of claim 2, further comprising:
   monitoring a rate of airflow at a first HVAC register in the first room;
   configuring a first command based at least in part on one or more of the monitored rate of airflow, the monitored environment in relation to the first room, and the configured climate policy of the first room; and
   sending the first command to a first data communication device coupled to the first HVAC register, the first command including a command to adjust the rate of airflow at the first HVAC register.

4. The method of claim 3, further comprising:
   adjusting the rate of airflow at the first HVAC register based at least in part on one or more of an airflow threshold, the monitored rate of airflow, the measured temperature of the first room, the monitored environment in relation to the first room, the configured climate policy for the first room, and a climate policy for the second room.

5. The method of claim 3, wherein the first command comprises instructions to actuate a first motor on the first HVAC register, the first motor being configured to adjust louvers on the first HVAC register.

6. The method of claim 1, further comprising:
   configuring a climate policy for the second room, wherein adjusting the opacity of the second tintable window of the second room is based at least in part on the configured climate policy.

7. The method of claim 6, further comprising:
   monitoring a rate of airflow at a second HVAC register in the second room;
   configuring a second command based at least in part on one or more of the monitored rate of airflow, the monitored environment in relation to the second room, and the configured climate policy of the second room; and
   sending the second command to a second data communication device coupled to the second HVAC register, the second command including a command to adjust the rate of airflow at the second HVAC register.

8. The method of claim 7, further comprising:
   adjusting the rate of airflow at the second HVAC register based at least in part on one or more of an airflow threshold, the monitored rate of airflow, the measured temperature of the second room, the monitored environment in relation to the second room, the configured climate policy for the second room, and a climate policy for the first room.

9. The method of claim 8, wherein the second command comprises instructions to actuate a second motor on the second HVAC register, the second motor being configured to adjust louvers on the second HVAC register.

10. The method of claim 1, wherein monitoring the environment in relation to the first room further comprises:
    determining at least one of a geographical direction of the first or second tintable window faces included in the first room, a time of day, a current month, a current season, a location of the building in relation to the Earth's northern and southern hemispheres, an output of a photosensor relative to the first or second tintable window faces, a temperature relative to a surface of the first or second tintable window faces, a sun path for a region relative to the building, or a combination thereof.

11. The method of claim 1, wherein adjusting the opacity of the first tintable window or adjusting the opacity of the second tintable window includes adjusting the opacity at least in part in response to an electrical signal received by a film applied the first tintable window or the second tintable window.

12. A computing device configured for heating ventilation and air conditioning (HVAC) systems, comprising:
   a processor;
   memory in electronic communication with the processor, wherein the memory stores computer executable instructions that when executed by the processor cause the processor to perform the steps of:
   measuring a temperature of a first room of a building via a first thermometer placed in the first room;
   measuring a temperature of a second room of the building via a second thermometer placed in the second room;
   determining a first geographical direction faced by a first tintable window of the first room and a second geographical direction faced by a second tintable window of the second room;
   monitoring an environment in relation to the first room of the building based at least in part on the first geographical direction and an environment in relation to the second room of the building based at least in part on the second geographical direction;
   adjusting an opacity of, the first tintable window of the first room based at least in part on the measured temperature of the first room and the monitored environment in relation to the first room; and
   adjusting an opacity of the second tintable window of the second room based at least in part on the measured temperature of the second room and the monitored environment in relation to the second room, the second direction being different from the first direction.

13. The computing device of claim 12, wherein the instructions executed by the processor cause the processor to perform the steps of:
   configuring a climate policy for the first room, wherein adjusting the opacity of the first tintable window of the first room is based at least in part on the configured climate policy.

14. The computing device of claim 13, wherein the instructions executed by the processor cause the processor to perform the steps of:
   monitoring a rate of airflow at a first HVAC register in the first room;
   configuring a first command based at least in part on one or more of the monitored rate of airflow, the monitored environment in relation to the first room, and the configured climate policy of the first room; and
   sending the first command to a first data communication device coupled to the first HVAC register the first command including a command to adjust the rate of airflow at the first HVAC register.

15. The computing device of claim 14, wherein the instructions executed by the processor cause the processor to perform the steps of:
   adjusting the rate of airflow at the first HVAC register based at least in part on one or more of an airflow threshold, the monitored rate of airflow, the measured temperature of the first room, the monitored environment in relation to the first room, the configured climate policy for the first room, and a climate policy for the second room.

16. The computing device of claim 14, wherein the first command comprises instructions to actuate a first motor on the first HVAC register, the first motor being configured to adjust louvers on the first HVAC register.

17. The computing device of claim 12, wherein the instructions executed by the processor cause the processor to perform the steps of:
   configuring a climate policy for the second room, wherein adjusting the opacity of the second tintable window of the second room in is based at least in part on the configured climate policy.

18. The computing device of claim 17, wherein the instructions executed by the processor cause the processor to perform the steps of:
   monitoring a rate of airflow at a second HVAC register in the second room;
   configuring a second command based at least in part on one or more of the monitored rate of airflow, the monitored environment in relation to the second room, and the configured climate policy of the second room; and
   sending the second command to a second data communication device coupled to the second HVAC register, the second command including a command to adjust the rate of airflow at the second HVAC register.

19. A non-transitory computer-readable storage medium storing computer executable instructions that when executed by a processor cause the processor to perform the steps of:
   measuring a temperature of a first room of a building via a first thermometer placed in the first room;
   measuring a temperature of a second room of the building via a second thermometer placed in the second room;
   determining a first geographical direction faced by a first tintable window of the first room and a second geographical direction faced by a second tintable window of the second room;
   monitoring an environment in relation to the first room of the building based at least in part on the first geographical direction and an environment in relation to the second room of the building based at least in part on the second geographical direction;
   adjusting an opacity of the first tintable window of the first room based at least in part on the measured temperature of the first room and the monitored environment in relation to the first room; and
   adjusting an opacity of the second tintable window of the second room based at least in part on the measured temperature of the second room and the monitored environment in relation to the second room.

20. The non-transitory computer-readable storage medium of claim 19, wherein the instructions executed by the processor cause the processor to perform the steps of:
   configuring a climate policy for the first room, wherein adjusting the opacity of the first tintable window of the first room in the first direction is based at least in part on the configured climate policy.

* * * * *